E. LACE.
GAMBREL.
APPLICATION FILED APR. 6, 1911.
1,006,955.
Patented Oct. 24, 1911.
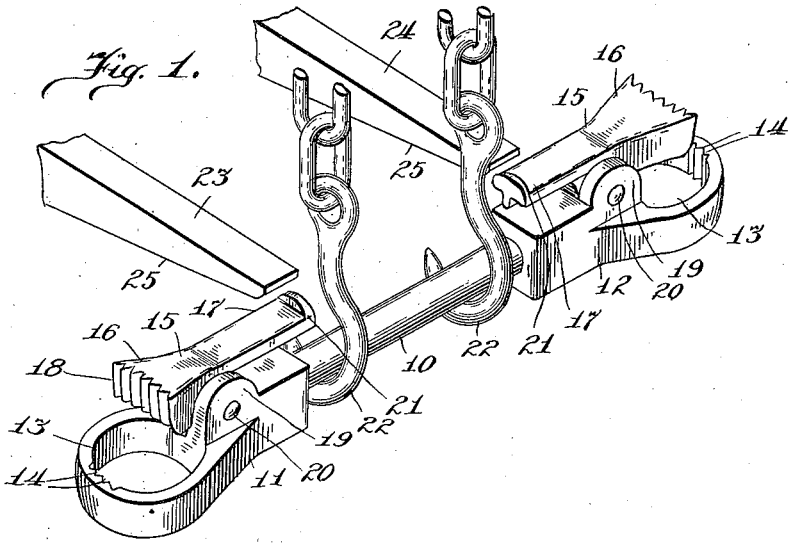
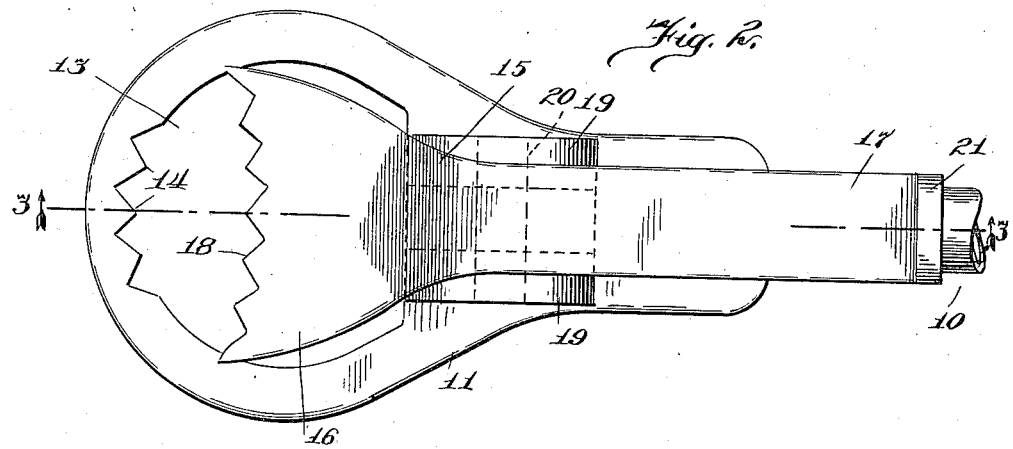
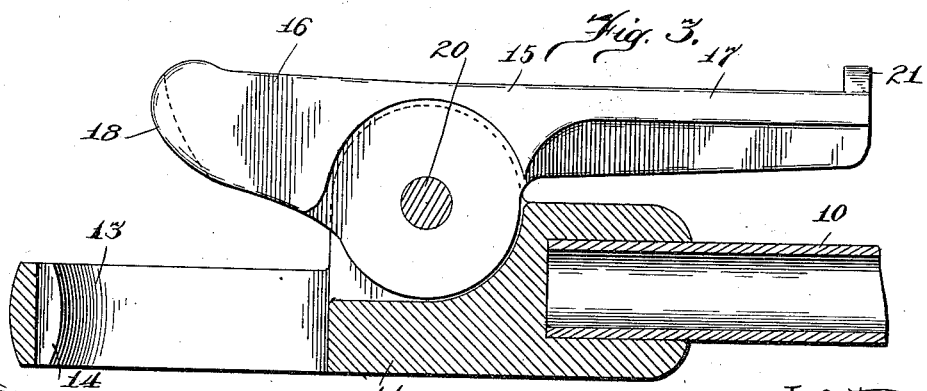
Witnesses
Wilton Lenoir
E. M. Klatcher
Inventor
Edward Lace.
By Gillson & Gillson
Attorneys.

UNITED STATES PATENT OFFICE.

EDWARD LACE, OF CHICAGO, ILLINOIS.

GAMBREL.

1,006,955.  Specification of Letters Patent.  Patented Oct. 24, 1911.

Application filed April 6, 1911. Serial No. 619,340.

*To all whom it may concern:*

Be it known that I, EDWARD LACE, a citizen of the United States, and resident of Chicago, county of Cook, and State of Illinois, have invented certain new and useful Improvements in Gambrels, of which the following is a specification, and which are illustrated in the accompanying drawings, forming a part thereof.

The invention relates to an improved form of gambrel adapted to be used in packing for extending the limbs of an animal carcass, particularly pork, and for supporting the carcass while being dressed and during its transportation from place to place.

The object of the invention is to provide an improved gambrel stick which may be engaged with the limbs of a carcass by automatic means.

In the accompanying drawings Figure 1 is a perspective view of a form of gambrel stick provided by the invention, and shows details of a mechanism which may be employed for automatically releasing the carcass held therein; Fig. 2 is a detail plan view showing one end of the grambrel; and Fig. 3 is a detail sectional view taken on the line 3—3 of Fig. 2, some of the parts being shown in elevation.

As shown in the drawings, the gambrel comprises a central shaft 10 preferably made of metal and in the form of a tube to reduce its weight. In practice a piece of pipe may be conveniently employed for the shaft 10. An apertured block, as 11 and 12, is rigidly mounted upon each end of the shaft 10. As shown, the blocks 11 and 12 are made of cast metal, and they are secured upon the ends of the shaft 10 by being cast directly upon the ends of the pipe which serves for the shaft. The aperture, as 13, of each of the blocks 11 and 12 is preferably of a proper size to receive the foot and adjacent portion of the limb of the carcass upon which the gambrel is to be used. As shown, a part of the rim of each of the apertures is provided with ribs 14 for gripping the limb of the carcass when pressed against it. A clutch arm 15 is provided adjacent each end of the gambrel for coöperating with the rib portion of the rim of the corresponding aperture 13 for gripping the limb of a carcass. Each of the clutch arms 15 is pivotally mounted upon the upper side of the gambrel stick in such a way that one of its ends, as 16, is adapted to swing downwardly into the adjacent aperture 13. Preferably the end 16 of each of the clutch arms is weighted, as by being made of greater width and depth than the other end portion 17 of the arm, and it has an outwardly facing ribbed surface 18.

As shown a pair of upstanding lugs 19 are formed upon each of the blocks 11 and 12 for receiving the corresponding clutch arm 15 between them, and a pivot pin 20 is passed through the lugs 19 and through the clutch arm 15 intermediate its ends. The inner end portion 17 of each of the clutch arms 15 extends over the adjacent portion of the shaft 10 in alinement with the shaft, and an upstanding cam lug 21 is formed upon the extreme inner end of the part 17.

In using the gambrel the feet of a carcass will be passed upwardly through the apertures 13 of the blocks 11 and 12, and when the hoofs have passed the clutch arms 15 the weighted ends 16 of these clutch arms will cause their ribbed surfaces 18 to bear against the adjacent portions of the limbs of the carcass, whereby the limbs will be gripped between the inwardly facing ribs 14 formed on the rims of the apertures 13 and the outwardly facing ends of the clutch arms. The gambrel may then be used for supporting the carcass, as by engaging the shaft 10 with the conveyer hooks 22 shown in Fig. 1. When the carcass has been transported to the place where it is to be divided, it may be released from the gambrel to fall upon a suitable table (not shown) by depressing the inner end portions 17 of the clutch arms 15. If desired, this may be effected through the use of stationary trips, as 23, 24, having inclined cam surfaces 25 extending in the path of movement of the cam lugs 21 when held in the conveyer hooks 22. By properly inclining the under surfaces 25 of the trips 23, 24, provision may be made for assorting the carcasses according to size, as a heavier carcass will require a greater depression of the inner ends 17 of the clutch arms 15 to be released from the gambrel than will be required for releasing a light carcass.

I claim as my invention—

1. In combination, a gambrel stick apertured adjacent each end to receive the foot of a carcass, and a clutch arm pivotally mounted upon the stick adjacent each of the apertures, one end of each of the clutch arms being movable into the corresponding aperture of the stick.

2. In combination, a gambrel stick apertured adjacent each end to receive the foot of a carcass, a clutch arm pivotally mounted upon the upper side of the gambrel stick adjacent each end, one end of each of said clutch arms being movable downwardly into the aperture at the same end of the stick, such ends of the clutch arms being weighted.

3. In combination, a gambrel stick apertured adjacent each end to receive the foot of a carcass, conveying means engageable with the stick, a clutch arm pivotally mounted upon the stick adjacent each of the apertures, one end of each of the clutch arms being movable into the aperture at the same end of the stick, and a trip engageable with the other end of each of the clutch arms.

EDWARD LACE.

Witnesses:
CHARLES B. GILLSON,
E. M. KLATCHER.

Copies of this patent may be obtained for five cents each, by addressing the "Commissioner of Patents, Washington, D. C."